(No Model.)

D. S. MACORQUODALE.
FENDER FOR STREET CARS.

No. 550,684. Patented Dec. 3, 1895.

Witnesses.

Inventor:
D. S. Macorquodale
by Fetherstonhaugh & Co. Atty

UNITED STATES PATENT OFFICE.

DUNCAN SUTHERLAND MACORQUODALE, OF TORONTO, CANADA.

FENDER FOR STREET-CARS.

SPECIFICATION forming part of Letters Patent No. 550,684, dated December 3, 1895.

Application filed March 8, 1895. Serial No. 541,039. (No model.) Patented in Canada July 26, 1894, No. 46,650.

*To all whom it may concern:*

Be it known that I, DUNCAN SUTHERLAND MACORQUODALE, of the city of Toronto, in the county of York, in the Province of Ontario, Canada, have invented certain new and useful Improvements in Fenders for Street-Cars, of which the following is a specification.

My invention relates to improvements in fenders for street-cars, patented to me in Canada, under No. 46,650, on the 26th day of July, 1894, and the object of my present invention is to simplify the construction and increase the utility of my device, so that it may be utilized for vestibule-cars; and it consists, essentially, in the construction, support, and connection of the fender to the brake-shaft, as hereinafter more particularly explained.

Figure 1:
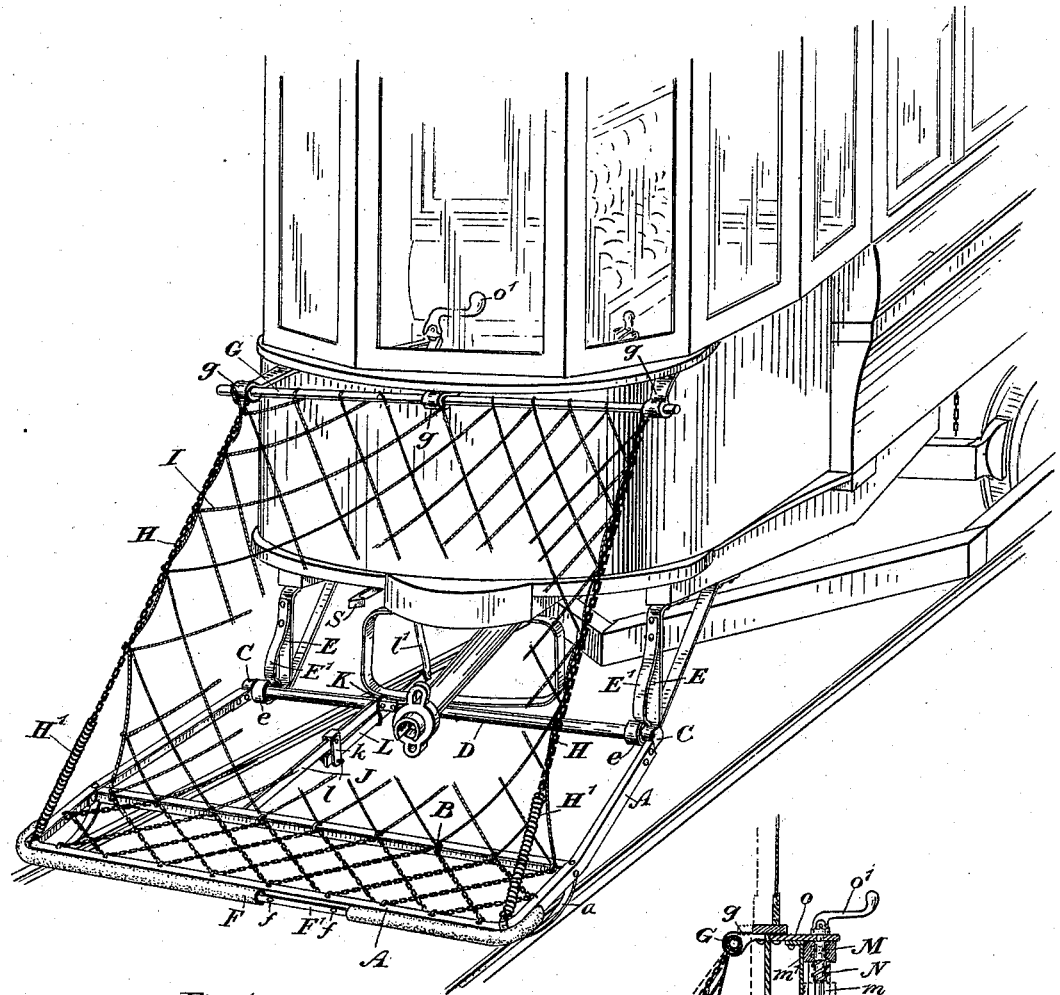
Figure 3:
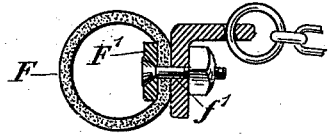
Figure 2:
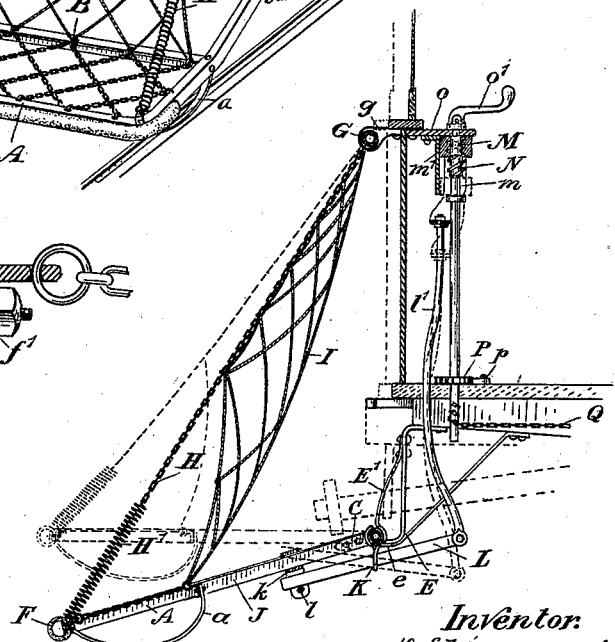

Figure 1 is a perspective view of the lower front portion of a vestibule-car provided with a fender constructed in accordance with my invention. Fig. 2 is a longitudinal section through the fender and front portion of the vestibule. Fig. 3 is a cross-section showing the means by which the cushion-tube is attached to the front bar of the fender.

In the drawings like letters of reference indicate corresponding parts in each figure.

The essential feature of my invention lies in the fact that the fender is operated through the brake shaft or rod during the period that the brake is being put on or thrown off, and this, it will be seen, is accomplished without any attention on the part of the motorman.

A is the main bar of the fender, which is preferably made of angle-iron or steel and bent around substantially in U shape, as shown. The cross-bar B, of angle-iron, is securely bolted to the sides of the U-shaped angle-bar A at a short distance from the front.

C are brackets bolted to the rear ends of the bar A and secured on the ends of the pivotal pipe D. The pipe D is supported at each end in the curled lower end $e$ of the hanger-brackets E.

E' are springs secured to the top of the hanger-brackets and extending down with ends practically concentric to the pivotal pipe D, and serve from their peculiar form to hold the bar securely in position and yet permit of the fender giving, should it strike an obstruction, without it springing out of place. These springs E' also provide for the device being easily removed when desired.

The front portion of the fender between the bar A and bar B is preferably filled with chain net work.

F is a cushion-tube, and F' is a bar which is passed through the cushion-tube in proximity to the bar A. The bolts $f$ secure the tube F to the bar A by means of the bar F', which prevents any possibility of the tube F being torn away from the bar A.

G is a cross-bar supported in suitable brackets $g$ beneath the windows of the vestibule.

H are the side chains, which are connected at the top to the bar G, and are connected at the bottom by the spiral springs H' to the front bar. The netting I fills up the space between the bars B G and the side chains H.

J is a bar extending substantially parallel to the sides of the bar A, between the bar B and pipe D, to which it is secured.

K is a loop extending downwardly from the pipe D.

$k$ is a saddle-bracket straddling the bar J.

L is a lever extending at the front end between the top of the saddle-bracket and a fastening-pin $l$ and resting upon the loop K. The rear end of the lever L is connected by a rod $l'$ to a bar $m$, attached to or forming part of the nut M.

N is a threaded sleeve secured on the brake shaft or rod O.

The nut M is preferably square and is held from rotating by a side bracket $m'$, abutting the nut and secured upon the top supporting-bracket $o$.

$o'$ is the handle of the brake-shaft.

P is the ratchet-wheel, secured to the shaft O near the floor, and $p$ is the dog coacting therewith, and Q is a brake-chain.

$a$ are skids secured at the front to the bar A and at the rear to the bar B. These skids are preferably constructed out of bar-steel in the form shown, and serve to support the front of the fender slightly above the ground when it is lowered, as shown in full lines in Figs. 1 and 2. The fender is lowered into the position shown in full lines in Fig. 2 from the position shown in dotted lines in that figure, as follows: The nut M is in the position on the sleeve shown in dotted lines. By turning the handle o' in the direction indicated by arrow, so as to put on the brake, the nut M, being normally pressed by the weight of the fender toward the sleeve N, is gradually forced up to the top of the brake-shaft O and draws with it the bar l' and tilts the lever L, so as to throw down the fender. It will be seen that the tendency of the springs H at the front of the fender is now to keep the nut normally pressing downwardly to the threaded sleeve. To raise the fender again, the handle is turned in the reverse direction to release the brake and the nut is caused to travel downwardly, so as to throw the rod l' and the rear end of the lever L downwardly. The torsion upon the brake-shaft O is sufficient to keep the fender raised.

In order to allow of pushing a car without removing the fender, I provide a hook-catch S, preferably underneath the front of the car. By withdrawing the pin l in the bracket k the fender may be now thrown up, so that the bar J may spring into the catch S, and thereby retain the fender in a vertical position.

Although I show the rod of the sleeve connected to the lever L at the rear of the pivot-point of the fender, it will, of course, be understood that in open cars, where the brake-rod is journaled outside the dashboard, such rod would be necessarily connected to a point on the fender in front of the pivot-point. Again, it might be preferable in my fender to have it evenly balanced by means of a counterweight behind the pivot-point, and this, of course, might be used, if necessary.

What I claim as my invention is—

1. In a car fender, the combination with the fender frame hinged to the front of the car, and the brake rod, of the vertically moving bar arranged to be moved up and down by the application and release of the brake, and the connection from said bar to the fender frame, substantially as described.

2. In combination with the fender frame hinged at the front of the car, the brake rod, the lever detachably connected to the fender and extending in rear of the pivot thereof, the bar arranged to be moved vertically by the movement of the brake rod, and connections from said bar to the lever, substantially as described.

3. The combination with the fender hinged at the rear beneath the front of the car and supported at the front from the dash board of the brake rod and handle, a threaded sleeve secured to the rod and a threaded nut capable of longitudinal movement on the rod held from turning and connecting means between the nut and the fender as and for the purpose specified.

4. The combination with the fender hinged at the rear beneath the dash board and the side supporting chains attached to the bar on the top of the dash board and connected by the lower spiral springs to the front bar of the fender, of the brake rod and means for connecting the fender to the brake rod, so that by the turning of such rod the fender may be raised or lowered as and for the purpose specified.

5. The combination with the fender hinged at the rear beneath the front of the car and supported at the front from the dash board and having a lever extending rearwardly of the pivot point, of the brake rod and handle, a threaded sleeve secured to the rod and a threaded nut M, bracket, m', bar, m, and rod, l' connecting the bar, m, to the lever, L, as and for the purpose specified.

6. In a car fender, the combination with the brackets secured to the car body and having forwardly extending hooked ends, of the pivoted fender frame having its pivots seated in said hooked ends, and the depending springs for yielding, holding said pivots within the hooks, substantially as described.

7. In a fender the combination with the frame having the rear pivotal pipe, D, of the hangers, E, with curled ends e, and springs, E', having concentric ends as and for the purpose specified.

8. In a fender the combination with the U-shaped angle bar, A, secured to the pivotal pipe, D, which is supported as specified, of the bar, J, saddle bracket, k, having pin, l, loop, K, secured to the pipe, D, lever, L, and means for connecting the lever to the brake rod, O, for raising and lowering the fender as and for the purpose specified.

DUNCAN SUTHERLAND MACORQUODALE.

Witnesses:
B. BOYD,
E. R. CASE.